Figure 1:
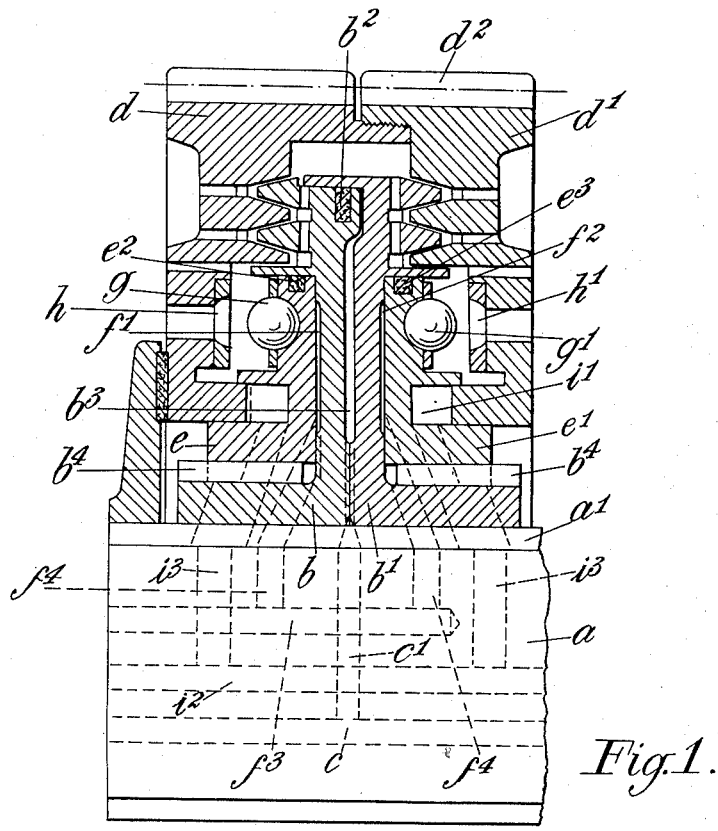

Inventor
T. Hindmarch

Inventor
T. Hindmarch

Patented Apr. 15, 1952

2,592,695

UNITED STATES PATENT OFFICE 2,592,695

FRICTION AND POSITIVE CLUTCH

Thomas Hindmarch, London, England

Application August 20, 1946, Serial No. 691,818
In Great Britain August 22, 1945

3 Claims. (Cl. 192—53)

This invention relates to power transmission mechanism and has for its object to devise an improved form of transmission which will be reliable and efficient in operation while at the same time being capable of transmitting relatively large torques in proportion to the over-all size of the mechanism employed.

The invention consists in power transmission mechanism comprising a non-positive friction clutch, a positive dog clutch for use in conjunction with the said friction clutch either or both being operable to connect a first rotatable member with a second rotatable member to impart a drive thereto, means for engaging and disengaging at least one of the said clutches by fluid pressure and means whereby said clutches are operable for engagement in a predetermined order or disengagement sequentially in either order or simultaneously.

A combination of clutches and couplings in accordance with my invention is ideally suited for use in gears or power transmissions of any kind or type as may be used for the main propulsion and/or auxiliary drives of ships, road and rail vehicles of any type, tanks, aircraft and also power transmission for all industrial and other purposes.

In one specific form the invention consists in combining a suitable form of pressure fluid operated friction clutch or coupling (herein referred to for brevity as the non-positive section) with a suitable form of positive or dog clutch (herein referred to for brevity as the positive section) which is also brought into operation by fluid under pressure, in such a manner that the non-positive section is first engaged thus taking up the drive smoothly, whereupon the positive section is engaged thus enabling a higher value of torque to be transmitted. When it is desired to disengage, the two sections may be disengaged in either order or simultaneously according to the requirements of the drive.

The non-positive section may be of any form suitable for operation by fluid under pressure but the driven element will normally be provided with V-shaped serrations which mesh with similar V-shaped serrations in the driving member, so as to obtain the maximum efficiency in heat dissipation. The positive section of the transmission may be of any convenient form, but in case of necessity it may of such a design as to limit at will the maximum power or torque which this positive section is capable of transmitting. Also the non-positive section may be provided with adjustment facilities so as to enable the slip torque or the slip power to be regulated and thus obtain any desired amount of relative movement between the driving positive and non-positive sections and the driven component.

The engagement of both the positive and the non-positive sections will normally be controlled in accordance with the invention by means of variation in the pressure of the fluid supplied to the sections, and springs or similar means may also be used to effect disengagement of either the positive and/or the non-positive section of the clutch or coupling on release of the fluid pressure. The operating fluid will be controlled by a suitable valve, or valves, situated in, or adjacent to, the sections to be controlled, or alternatively they may be situated at a suitable remote point. In either case, the valves may be controlled directly or indirectly either by hydraulic or other suitable means.

When hydraulic pressure is employed for the control of the sections, it may be supplied to the transmission either by means of static head or alternatively by a suitable pump.

Further features of the invention will be apparent from the description given hereafter.

The accompanying drawings illustrate several modes of carrying out the invention.

Figure 4:
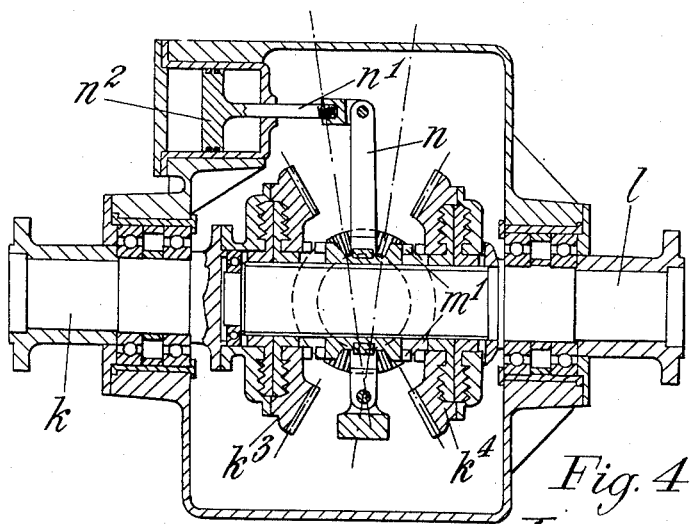
Figure 2:
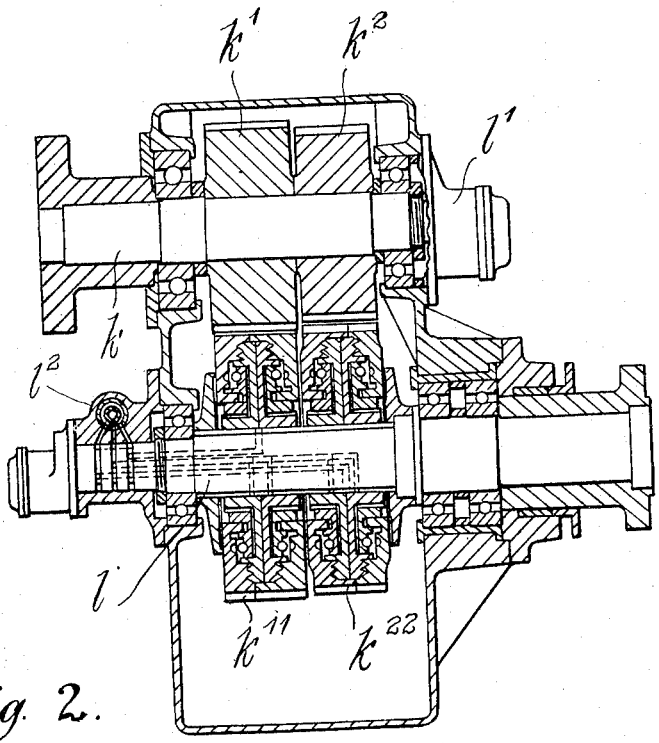
Figure 3:
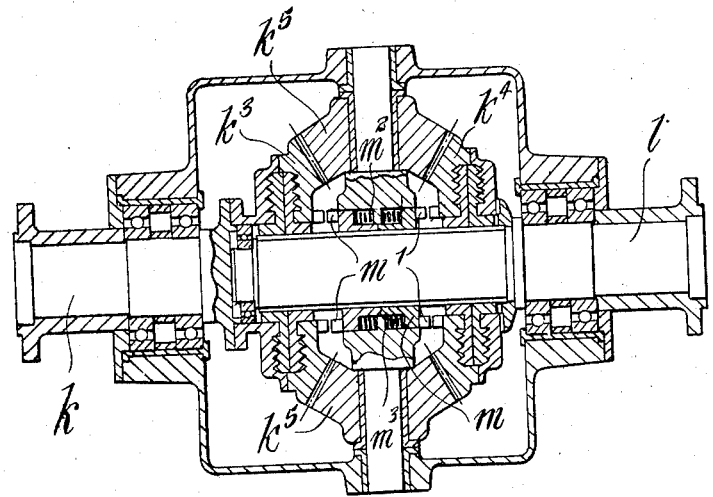

Figure 1 is a cross-sectional elevation showing one form of clutch in accordance with the invention, Figures 2 to 4 respectively are sectional views illustrating different forms of transmission in accordance with the invention.

In carrying my invention into effect in one convenient manner and in one of its simplest forms when used, for example, as a clutch incorporated in a gear wheel or pinion and as illustrated in Figure 1, I provide a shaft $a$ having splines $a'$ formed thereon and similar splines are formed in the bores of the inner members $bb'$ of a pressure fluid operated coupling in such a manner that the inner members can slide freely along the shaft. The outer edges of the inner members $bb'$ are so formed that, together with an expanding ring or other suitable seal or gland $b^2$, they contain a chamber $b^3$ to which oil or other suitable fluid is supplied at a suitable pressure through an axial hole $c$ and a radial hole $c'$ in the shaft $a$, thus forcing the two inner members apart until V-shaped rings formed on their outer faces engage with corresponding grooves formed in the inner faces of the outer members $dd'$ of the coupling. The said outer members have teeth $d^2$ formed on their outer periphery and are arranged so that they can rotate freely on journals formed on intermediate members $ee'$. Splines $b^4$ are formed on bosses on the inner members $bb'$ and corresponding splines are formed in the bores of the intermediate members $ee'$ in such a way that the latter can slide freely on the inner members. The intermediate members $ee'$ and the inner members $bb'$ are so formed together with suitable glands or seals $e^2e^3$ that they contain chambers $f'f^2$ to which a further supply of pressure fluid is supplied through a second axial hole $f^3$ in the shaft and by way of radial or other holes or channels $f^4$, thus forcing the intermediate members $ee'$ outwards until steel balls $gg'$ or other dog members mounted by suitable means on the outer faces of the intermediate members engage with similarly spaced spherically shaped cups $hh'$ or other suitable parts formed in the inner faces of the outer members $dd'$. The positive section of the clutch is then engaged.

Both the positive and the non-positive sections of the clutch or coupling may be disengaged by supplying pressure fluid to annular chambers $ii'$ formed between the outer members $dd'$ and the intermediate members $ee'$, such pressure fluid being supplied by way of a third axial hole $i^2$ in the shaft and ducts or channels $i^3$ connecting the same to the annular chambers, it being understood that at the same time the pressure which exists in the chamber $b^3$ between the inner members and the chambers $f'f^2$ between the inner and intermediate members is released. The clutch or coupling thus fully disengaged enables the outer members to rotate freely relative to the intermediate and inner members and the shaft.

In the foregoing the positive section is of a smaller diameter than the non-positive section but it is of course understood that the invention is not limited to this arrangement only and according to requirements the sizes or diameters of the positive and the non-positive sections are in no way related to one another; for example when applied to a long pinion of relatively small diameter the two sections may be mounted side by side in the same unit. Alternatively the two sections may be mounted as separate units on the same shaft.

Furthermore, the invention is not restricted to its application to a gear wheel, but may equally be applied to any form of power transmission mechanism or component thereof wherein a driving member is to be coupled to a driven member, the members being co-axial.

A typical application of the invention to a marine reverse reduction gear which is used for the drive of a ship propeller is shown in Figure 2 and wherein the input shaft $k$ carries two driving pinions $k'k^2$, one of which $k'$ engages directly with a gear wheel $k^{11}$ on the output shaft $l$, while the other $k^2$ engages indirectly with a second gear wheel $k^{22}$ on the output shaft, the gear wheels on the output shaft being formed and operated as above described.

Fluid under pressure is supplied by a pump $l'$ and the control of the pressure fluid to the various sections of the clutches is effected by the valve $l^2$.

Any number of clutches may be used to obtain the number of speeds required in either direction of rotation of the output shaft. The clutches may be mounted on the input shaft or any intermediate shaft, or some on each.

From the foregoing description of one embodiment of the invention it will be apparent that the transmission mechanism comprises a non-positive friction clutch and a dog or other positive clutch in parallel therewith and means for engaging firstly the non-positive clutch followed by the positive clutch to complete the drive. These two clutches are arranged together in one pinion in this construction, but in other embodiments of the invention the two clutches are arranged to operate in parallel with one another in a similar manner to that described but are physically separated in the construction.

The embodiment of the invention shown in Figure 3 shows such a separation of the clutches in which the input is applied to shaft $k$ while $l$ is the output shaft coaxial therewith. The arrangement incorporates a reverse bevel pinion $k^5$ by which the drive to the output shaft $l$ can be reversed. For one direction of rotation of the output shaft the drive is by way of the outer member of the non-positive friction clutch $k^3$ and the co-operating inner members of this clutch which are splined upon the inner end of the shaft $l$. The corresponding positive section which works with this non-positive clutch is provided by the dog teeth $m^1$ on the central member $m$ showed splined on the shaft $l$ which coacts with teeth upon the said outer member of the non-positive clutch $k^3$. Thus, by the movement of the central member $m$ of the positive clutch of the left of the figure a positive engagement between the input shaft $k$ and the output shaft $l$ is made in parallel with the previously engaged non-positive friction clutch $k^3$.

By the engagement of the non-positive clutch $k^4$ instead of the non-positive clutch $k^3$ a reverse drive is imparted to the output shaft $l$ by way of the bevel pinion $k^5$ freely mounted on the shaft $m^2$ in the casing. By movement of the central member $m$ of the positive clutch to the right of the figure the outer casing of the second mentioned non-positive clutch is positively connected to the shaft $l$. Owing to the proportioning of the length of the central clutch member both dog clutches cannot be engaged simultaneously. It can be seen from the above description that this embodiment includes two transmission mechanisms in accordance with the invention one for one direction of drive and the other for the reverse direction of drive.

The non-positive clutches are operated by pressure fluid means as described for the embodiment of Figures 1 and 2 (the control means for which is not shown on the drawings) while the positive clutch is engaged and disengaged by the introduction of fluid into the chamber $m^3$ alternatively to move the member $m$ in one direction or the other.

Figure 4 shows a further embodiment which is similar to that of Figure 3 except in that the dog teeth $m^1$ are provided on a centre member which is caused to move longitudinally of the shaft $l$ by a lever $n$ which is operated by the movement of a piston $n^2$ in a cylinder by means of the rod $n^1$. By the change of fluid pressure in the cylinder the piston is moved and either of the sets of dogs caused to be engaged in a similar manner to the construction of Figure 3.

Many other applications of the invention will suggest themselves to those skilled in the art, and it will of course be understood that my invention extends generally to a power transmission mechanism comprising a combination of a positive and a non-positive section of a clutch, both of the sections being operated by fluid under pressure, the sequence of operation of the positive and and the non-positive section being controlled by a suitable valve or a series of valves. It is further understood that the invention is not limited to the foregoing details of construction which are given purely by way of example only and to illustrate the nature of my invention and not to limit its scope.

It will also be clear that any type or design of valve or a combination of a number of valves may be used to distribute or direct the pressure fluid to the various chambers and spaces in any section of the clutch or clutches.

I claim:

1. In a power transmission mechanism for coupling one rotatable member to another rotatable member, an inner coupling element supported by one of said rotatable members for rotary movement therewith and capable of axial sliding movement, a pressure member supported by the first named rotatable member, said inner coupling element and pressure member including means defining a fluid chamber therebetween, an intermediate member supported by said inner coupling element for rotation therewith and capable of axial sliding movement toward and away from the inner coupling element, the inner coupling element and intermediate member including means constituting a fluid chamber therebetween, an outer coupling element rotatably supported by the intermediate member and including means for imparting rotation to the other of said rotatable members, said intermediate member and outer coupling element being provided with means defining a fluid chamber therebetween, complemental coacting faces on the inner coupling element and the outer coupling element constituting a non-positive friction clutch, complemental coacting parts on the intermediate member and outer coupling element constituting a positive clutching means, and further means defining fluid conduits leading to the chambers between the pressure member and the inner coupling element, the inner coupling element and the intermediate member and the intermediate member and the outer coupling element respectively, whereby the introduction of fluid into the chamber between the inner coupling element and pressure member moves said inner coupling element axially to effect engagement of the coacting faces on the coupling elements, while the introduction of fluid into the chamber between the inner coupling element and the intermediate member moves the intermediate member axially to engage the coacting parts on said member and outer coupling element and the introduction of fluid into the chamber between the intermediate member and the outer coupling element moves said member and inner coupling element toward the inner coupling element and pressure member whereby the coacting parts on the intermediate member and outer coupling element and the coacting faces on the inner coupling element and the outer coupling element are moved apart.

2. In a power transmission mechanism for coupling a first rotatable member to a second rotatable member, a pair of inner coupling elements supported by one of said rotatable members for rotary movement therewith and capable of axial sliding movement toward and away from each other, said inner coupling elements including means defining a fluid chamber therebetween, a pair of intermediate members supported by said inner coupling elements for rotation with said elements and capable of axial sliding movement toward and away from the inner coupling elements, each of said inner coupling elements and intermediate members including means constituting a fluid chamber therebetween, an outer coupling element rotatably supported by said intermediate members and including means for imparting rotation to the other of said rotatable members, said intermediate members and outer coupling element provided with means defining a fluid chamber therebetween, the said inner coupling elements and outer coupling element being provided with complemental coacting faces constituting a non-positive friction clutch, said intermediate members and outer coupling element having complemental coacting parts defining a positive clutching means, and further means defining fluid conduits leading to the chambers between said inner coupling elements, the inner coupling elements and the intermediate members and the intermediate members and the outer coupling element respectively whereby the introduction of fluid into the chamber between the inner coupling elements moves said elements axially away from each other to effect engagement of the coacting faces on the inner coupling elements and the outer coupling element, while the introduction of fluid into the chamber between the inner coupling elements and the intermediate members will move said members axially away from each other whereby the coacting parts on said members and outer coupling element become engaged and the introduction of fluid into the chamber between the intermediate members and the outer coupling element moves said intermediate members and inner coupling elements axially toward each other to move the coacting parts on the intermediate members and the outer coupling element and the coacting faces on the inner coupling elements and the outer coupling apart.

3. In a power transmission mechanism as defined in and by claim 1 wherein one of the rotatable members is an output shaft and wherein the other rotatable member is an input shaft and said inner coupling element being supported by said output shaft.

THOMAS HINDMARCH.

REFERENCES CITED

The following references are of record in the file of this patent:

UNITED STATES PATENTS

| Number | Name | Date |
|---|---|---|
| 196,822 | Osborn | Nov. 6, 1877 |
| 1,661,613 | Jackson | Mar. 6, 1928 |
| 1,693,645 | Fahrney | Dec. 4, 1928 |
| 2,046,428 | Riley | July 7, 1936 |
| 2,091,557 | Montgomery | Aug. 31, 1937 |
| 2,161,702 | Durig | June 6, 1939 |
| 2,306,643 | Sewell | Dec. 29, 1942 |
| 2,328,090 | Nutt | Aug. 31, 1943 |
| 2,379,164 | Larsen | June 26, 1945 |
| 2,423,886 | Hindmarch | July 15, 1947 |

FOREIGN PATENTS

| Number | Country | Date |
|---|---|---|
| 139,104 | Switzerland | Mar. 31, 1930 |
| 146,230 | Austria | June 25, 1936 |
| 810,262 | France | Mar. 18, 1937 |
| 858,401 | France | Nov. 25, 1940 |